United States Patent
Nakakubo et al.

(10) Patent No.: US 7,816,047 B2
(45) Date of Patent: Oct. 19, 2010

(54) METHOD FOR STOPPING POWER GENERATION OF FUEL CELL SYSTEM AND FUEL CELL SYSTEM INCLUDING POWER GENERATION STOPPING UNIT

(75) Inventors: Toru Nakakubo, Kawasaki (JP); Jun Yamamoto, Tokyo (JP); Shoji Ihara, Yokohama (JP); Kazuyuki Ueda, Tokyo (JP); Satoshi Mogi, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 90 days.

(21) Appl. No.: 12/095,076

(22) PCT Filed: Aug. 8, 2007

(86) PCT No.: PCT/JP2007/065884
§ 371 (c)(1),
(2), (4) Date: May 27, 2008

(87) PCT Pub. No.: WO2008/026449
PCT Pub. Date: Mar. 6, 2008

(65) Prior Publication Data
US 2009/0169926 A1 Jul. 2, 2009

(30) Foreign Application Priority Data
Aug. 29, 2006 (JP) ............................... 2006-232719

(51) Int. Cl.
*H01M 8/04* (2006.01)
(52) U.S. Cl. ........................................................ 429/429
(58) Field of Classification Search ................... 429/429
See application file for complete search history.

(56) References Cited

U.S. PATENT DOCUMENTS

| 4,963,443 | A * | 10/1990 | Kamoshita | 429/423 |
| 6,423,437 | B1 | 7/2002 | Kenyon et al. | |
| 6,645,654 | B2 * | 11/2003 | Yagi | 429/413 |
| 6,858,336 | B2 * | 2/2005 | Reiser et al. | 429/415 |
| 7,157,164 | B2 | 1/2007 | Nakanishi et al. | |
| 2005/0208358 | A1 | 9/2005 | Nishimura et al. | |
| 2007/0166582 | A1 | 7/2007 | Okamoto | |

FOREIGN PATENT DOCUMENTS

| JP | 2-244559 A | 9/1990 |
| JP | 5-126267 A | 5/1993 |
| JP | 6-94147 A | 4/1994 |
| JP | 7-272740 A | 10/1995 |

(Continued)

*Primary Examiner*—Patrick Ryan
*Assistant Examiner*—Thomas H. Parsons
(74) *Attorney, Agent, or Firm*—Fitzpatrick, Cella, Harper & Scinto

(57) ABSTRACT

There is provided a method for stopping power generation of fuel cell system including: a fuel cell having a fuel electrode and an oxidizer electrode; a fuel container; and a fuel flow path for supplying a fuel from the fuel container to the fuel cell, which enables suppression of a pressure difference between the fuel electrode and the oxidizer electrode during a stop state of an operation of the fuel cell, the method including the steps of, during the stop state of the operation of the fuel cell: stopping supply of the fuel from the fuel container to the fuel cell; consuming a residual fuel in the fuel flow path by short-circuiting the fuel electrode and the oxidizer electrode or connecting a load between the fuel electrode and the oxidizer electrode; and opening the fuel flow path to the atmosphere.

20 Claims, 8 Drawing Sheets

FOREIGN PATENT DOCUMENTS

| | | |
|---|---|---|
| JP | 8-195210 A | 7/1996 |
| JP | 8-255625 A | 10/1996 |
| JP | 2002-50372 A | 2/2002 |
| JP | 2003-168453 A | 6/2003 |
| JP | 2003-317770 A | 11/2003 |
| WO | 2005/078845 A2 | 8/2005 |

* cited by examiner

METHOD FOR STOPPING POWER GENERATION OF FUEL CELL SYSTEM AND FUEL CELL SYSTEM INCLUDING POWER GENERATION STOPPING UNIT

CROSS REFERENCE TO RELATED APPLICATIONS

This application claims the benefit of Japanese Patent Application No. 2006-232719, filed Aug. 29, 2006, which is hereby incorporated by reference herein in its entirety.

TECHNICAL FIELD

The present invention relates to a method for stopping power generation of fuel cell system, and a fuel cell system including a power generation stopping unit.

BACKGROUND ART

Recently, mobile electronic equipment, such as a mobile phone, a personal digital assistant (PDA), a notebook personal computer, a digital camera, or a digital camcorder, has become multifunctional. The amount of information processed by this equipment has increased, leading to a larger power consumption.

Therefore, there is a great demand for a higher energy density of a mounted battery.

A fuel cell directly converts chemical energy, which is obtained by chemically reacting hydrogen with oxygen, into electric energy.

An energy density of hydrogen itself is high, and oxygen is taken in from an outside air, so an active material is not necessarily provided in advance to a cathode side. Therefore, an energy capacity per volume/per mass can be dramatically increased as compared to a conventional fuel cell.

Among those, a polymer electrolyte fuel cell (PEFC) is suitably mounted onto a portable electronic apparatus, since it has high handling ability, is actuated at low temperature, can be quickly started/stopped, etc.

The polymer electrolyte fuel cell basically includes a proton conductive polymer electrolyte membrane and a pair of electrodes provided on both sides of the polymer electrolyte membrane.

The electrode includes a catalyst layer made of platinum or a platinum-group metal catalyst and a gas diffusion electrode formed on an outer surface of the catalyst layer to supply and collect a gas.

A member obtained by integrating the electrodes and the polymer electrolyte membrane is called a membrane electrode assembly (MEA). A fuel (hydrogen) is supplied to one of the electrodes, and an oxidizer (oxygen) is supplied to the other of the electrodes, thereby performing power generation.

At this time, water is generated as a product thereof. Reaction formulae in the anode and the cathode are as follows.

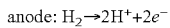

anode: $H_2 \rightarrow 2H^+ + 2e^-$

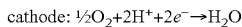

cathode: $\frac{1}{2}O_2 + 2H^+ + 2e^- \rightarrow H_2O$

A logical voltage of one membrane electrode assembly set is about 1.23 V. In a normal operation state, the membrane electrode assembly is often used when the logical voltage is about 0.7 V. Therefore, when a higher electromotive voltage is required, a plurality of cell units is stacked and is electrically connected in series for use.

The stacked structure as described above is called a fuel cell stack. Normally, in the stack, an oxidizer flow path and a fuel flow path are separated from each other by a member called a separator.

There are various types of fuels for the fuel cell. There are employed a method of directly supplying a liquid fuel, such as methanol, a method of supplying pure hydrogen, and a method of supplying hydrogen by reforming a liquid fuel.

For the portable electronic apparatus, the hydrogen supplying method is preferable because an output is high and the hydrogen supplying method is advantageous in downsizing.

In the polymer electrolyte fuel cell, in a state where a circuit for connecting output terminals of the fuel cell and a load to each other is in an open state, when the fuel and the oxidizer are left to remain, the fuel causes catalytic combustion due to a phenomenon of the fuel passing through a polymer electrolyte membrane (cross leakage), resulting in deterioration of the fuel cell.

Further, it is known that when the fuel and the oxidizer remain to cause a difference in potential between a fuel electrode and an oxidizer electrode, deterioration of components, such as a catalyst and an electrolyte, is promoted.

In order to prevent the deterioration, at the time of stopping the fuel cell, a unit for quickly eliminating the remaining fuel and oxidizer is required.

In a conventional technique, in order to prevent the deterioration, Japanese Patent Application Laid-Open No. H07-272740 discloses a method of purging an inside of a gas flow path using an inert gas (nitrogen) at a time of stopping the fuel cell.

However, in this method, it is necessary to mount a container in the fuel cell system, for storing the inert gas.

In this case, as a method of obtaining the inert gas, Japanese Patent Application Laid-Open No. 2002-50372 discloses a method of obtaining the inert gas for purging, by reacting hydrogen with air using a hydrogen combustor.

Further, Japanese Patent Application Laid-Open No. H08-255625 discloses a method of reducing a voltage between terminals of the fuel cell to be equal to or lower than a predetermined voltage by consuming a residual gas by power generation of the fuel cell after the purging.

Further, Japanese Patent Application Laid-Open No. 2003-317770 discloses a fuel cell system having a structure in which, after stopping the fuel cell, by shutting off distribution of a fuel gas and short-circuiting the terminals, the fuel in the anode is consumed.

Further, in a large fuel cell system, in many cases, an amount of the fuel supplied and circulated is equal to or larger than an amount of the fuel consumed in power generation. On the other hand, in a fuel cell system for a small electronic apparatus, in many cases, there is employed a system in which the fuel flow path is dead ended, and only an amount of the fuel consumed is supplied.

Note that, in this case, there is a problem in that an impurity is accumulated in the fuel flow path, so that power generation performance degrades over time.

Thus, conventionally, a purge valve is provided in the flow path to periodically perform a purge operation.

In particular, U.S. Pat. No. 6,423,437 discloses a technique in which, in a dead-ended small fuel cell, without using an active purge valve, the fuel flow path is purged by a passive mechanism, thereby preventing degradation of the power generation performance.

A relief valve is also called a safe valve, and is a valve which opens when a pressure in the flow path exceeds a predetermined pressure to release the pressure to the outside.

A specific structure thereof is as illustrated in Japanese Patent Application Laid-Open No. H06-94147.

Meanwhile, a check valve is a valve having a function of allowing a fluid to flow in only one direction and preventing the fluid from flowing in the opposite direction.

A specific structure of the check valve is as illustrated in Japanese Patent Application Laid-Open No. H05-126267.

However, in the above-mentioned conventional technique, provided is a fuel cell system having a structure in which an amount of a gas supplied is equal to or larger than an amount thereof consumed in the power generation, and the supplied gas is circulated in the flow path.

Those include an actively-controlled scavenge unit or discharge unit, so there is a problem of inducing an increase in the size of the system.

Further, in a case where a resistor is connected to the fuel electrode and the oxidizer electrode of the fuel cell to consume a residual gas, when the purging is not performed, a pressure in the fuel flow path or in the oxidizer flow path becomes a negative pressure, thereby causing a pressure difference between the fuel electrode and the oxidizer electrode to fluctuate to a large degree.

Thus, there is a problem in that mechanical deterioration or leakage is promoted.

Conversely, when the purging is performed, there is a problem in that an unreacted fuel is perhaps released to the outside of the system.

Further, in a case where a plurality of fuel cell units is connected in series (stacked) for use, there arises the following problem.

That is, in an operation of the fuel cell in a state close to a power generation performance limit of the fuel cell in which terminals are short-circuited, there is a case where polarity inversion occurs in which one fuel cell unit is forcedly applied with voltage of the other fuel cell units, thereby causing deterioration of the fuel cell.

Further, in a small fuel cell system for a portable electronic apparatus, as an oxidizer gas, oxygen in air is supplied by natural diffusion, and a pressure of hydrogen as the fuel gas is set slightly higher than the atmospheric pressure, thereby allowing the hydrogen to be introduced and diffused in the fuel flow path.

The fuel flow path has a dead-ended mechanism, which is a non-circulation system having an inlet for hydrogen, and an outlet therefor, which is basically closed. In many cases, there is used a system in which only an amount of the fuel consumed is charged.

Further, in order to reduce the size, it is desirable to omit as many unnecessary accessories as possible.

Therefore, it is desirable that by replacing air in the fuel flow path instead of introducing an inert gas, generation of a difference in potential between the fuel electrode, which is an anode, and the oxidizer electrode, which is a cathode, be prevented.

In this case, an autonomous control needs to be performed without using a controller for controlling scavenging and discharging, thereby achieving both quick air replacement in the fuel flow path and prevention the release of an unreacted fuel to the outside of the system.

Further, a structure with which the pressure difference between the anode and the cathode can be quickly eliminated is required. The technique disclosed in the above-mentioned U.S. Pat. No. 6,423,437 does not fully satisfy those requirements.

DISCLOSURE OF THE INVENTION

The present invention relates to a fuel cell system having a structure, in which an inside of a fuel flow path is replaced with air without using an inert gas, thereby suppressing a pressure difference between an anode and a cathode during a stop state of an operation, and capable of suppressing deterioration of a fuel cell and of downsizing, and to a method for stopping power generation of the fuel cell system.

Further, the present invention relates to a fuel cell system capable of quickly eliminating the pressure difference between the anode and the cathode during the stop state of the operation at the time of replacement of air described above, and capable of enhancing safety, and to a method for stopping power generation of the fuel cell system.

According to the present invention, there is provided a method for stopping power generation of fuel cell system including: a fuel cell having a fuel electrode and an oxidizer electrode; a fuel container; and a fuel flow path for supplying a fuel from the fuel container to the fuel cell, which enables suppression of a pressure difference between the fuel electrode and the oxidizer electrode during a stop state of an operation of the fuel cell, the method including the steps of, during the stop state of the operation of the fuel cell:

stopping supply of the fuel from the fuel container to the fuel cell;

consuming a residual fuel in the fuel flow path by short-circuiting between the fuel electrode and the oxidizer electrode or connecting a load between the fuel electrode and the oxidizer electrode; and opening the fuel flow path to the atmosphere.

Further, according to the present invention, a method for stopping power generation of fuel cell system is characterized in that the step of stopping supply of the fuel is performed first among the step of stopping supply of the fuel, the step of consuming the residual fuel, and the step of opening the fuel flow path to the atmosphere.

Further, according to the present invention, a method for stopping power generation of fuel cell system is characterized in that the step of consuming the residual fuel is performed first among the step of consuming the residual fuel and the step of opening the fuel flow path to the atmosphere.

Further, according to the present invention, a method for stopping power generation of fuel cell system is characterized in that opening the fuel flow path to the atmosphere starts when a pressure in the fuel flow path becomes negative with respect to the atmospheric pressure due to the consumption of the residual fuel in the step of consuming the residual fuel.

Further, according to the present invention, a method for stopping power generation of fuel cell system is characterized in that opening the fuel flow path to the atmosphere starts when an electromotive force of the fuel cell becomes equal to or smaller than a predetermined value.

Further, according to the present invention, a method for stopping power generation of fuel cell system is characterized in that opening the fuel flow path to the atmosphere starts when a pressure in the fuel flow path becomes equal to or lower than a predetermined value.

Further, according to the present invention, a method for stopping power generation of fuel cell system is characterized in that opening the fuel flow path to the atmosphere starts when the step of consuming the residual fuel is performed first among the step of consuming the residual fuel and the step of opening the fuel flow path to the atmosphere and a predetermined time period elapses.

Further, according to the present invention, a method for stopping power generation of fuel cell system is characterized in that stopping the supply of the fuel is performed by closing a fuel supply valve provided in the fuel flow path or releasing connection between the fuel container and the fuel cell.

Further, according to the present invention, a method for stopping power generation of fuel cell system is characterized in that opening the fuel flow path to the atmosphere is performed by opening a flow path opening provided to the fuel flow path, releasing connection between the fuel container and the fuel cell, or operating a negative pressure operation valve provided to the fuel flow path through an intermediation of the atmosphere.

Further, according to the present invention, a method for stopping power generation of fuel cell system is characterized in that short-circuiting between the fuel electrode and the oxidizer electrode or connecting the load between the fuel electrode and the oxidizer electrode is continued at least until an electromotive force of the fuel cell becomes equal to or smaller than a predetermined value.

Further, according to the present invention, a method for stopping power generation of fuel cell system is characterized in that short-circuiting between the fuel electrode and the oxidizer electrode or connecting the load between the fuel electrode and the oxidizer electrode is continued at least until a predetermined time period elapses.

Further, according to the present invention, a method for stopping power generation of fuel cell system is characterized in that the fuel cell includes a fuel cell stack having a plurality of fuel cell units stacked on each other; and short-circuiting between the fuel electrode and the oxidizer electrode or connecting the load between the fuel electrode and the oxidizer electrode is performed between the fuel electrode and the oxidizer electrode of each of the fuel cell units or between output terminals of the fuel cell stack.

Further, according to the present invention, a method for stopping power generation of fuel cell system is characterized in that the oxidizer electrode includes a flow path opened to the atmosphere.

Further, according to the present invention, a method for stopping power generation of fuel cell system is characterized in that the fuel cell includes, at one end thereof, a fuel inlet for supplying the fuel and, at another end thereof, a flow path opening for opening the fuel flow path to the atmosphere in the step of opening the fuel flow path to the atmosphere; the flow path opening is closed at least during normal power generation.

Further, according to the present invention, a fuel cell system is characterized in that the system includes:
  a fuel cell having a fuel electrode and an oxidizer electrode;
  a fuel container;
  a fuel flow path for supplying a fuel from the fuel container to the fuel cell;
  a fuel supply control unit, which is provided in the fuel flow path between the fuel cell and the fuel container, for controlling supply of the fuel;
  a fuel consuming unit for providing a resistor to connect the fuel electrode and the oxidizer electrode of the fuel cell to each other; and
  a unit for opening the fuel flow path to the atmosphere, which is provided in the fuel cell system.

Further, according to the present invention, a fuel cell system is characterized in that the unit for opening the fuel flow path to the atmosphere includes a flow path opening provided to the fuel flow path.

Further, according to the present invention, a fuel cell system is characterized in that the unit for opening the fuel flow path to the atmosphere includes a unit allowing the atmosphere to flow into the fuel flow path due to disconnection between the fuel container and the fuel cell.

Further, according to the present invention, a fuel cell system is characterized in that the unit for opening the fuel flow path to the atmosphere includes a negative pressure operation valve, which is provided to the fuel flow path through an intermediation of the atmosphere, and which is in a close state when a pressure in the fuel flow path is equal to or higher than the atmospheric pressure, and is in an open state when the pressure in the fuel flow path is lower than the atmospheric pressure.

Further, according to the present invention, a fuel cell system is characterized in that the negative pressure operation valve is structured so that a fluid flows only in one direction from a side of the atmosphere to a side of the fuel flow path.

Further, according to the present invention, a fuel cell system is characterized in that the negative pressure operation valve is opened by a predetermined pressure lower than the atmospheric pressure.

Further features of the present invention will become apparent from the following description of exemplary embodiments with reference to the attached drawings.

BEST MODES FOR CARRYING OUT THE INVENTION

Embodiments of the present invention will be described in detail with reference to the drawings.

In the present invention, "operation stop of fuel cell" represents one step when power generation of the fuel cell system is stopped and includes a step of stopping fuel supply, a step of consuming a residual fuel and a step of opening to the atmosphere. The details of the steps will be explained later. When power generation of the fuel cell system is stopped, in addition to the step of "operation stop of fuel cell", there may be other steps such as a step of transmitting power generation stopping signals from the fuel cell system to the outside and a step of displaying an estimated time until completion of power generation stop.

Embodiment 1

In Embodiment 1, a description will be made of a fuel cell system to which the present invention is applied and a method for stopping power generation of the fuel cell system.

Figure 1:
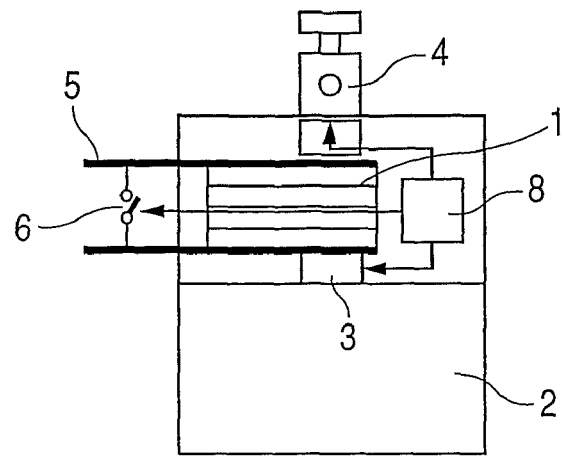
FIG. 1 is a diagram illustrating a schematic structure of a fuel cell system according to Embodiment 1 of the present invention.

FIG. 1 is a schematic diagram illustrating the fuel cell system according to this embodiment.

In FIG. 1, there are provided a fuel cell 1, a fuel tank 2, a fuel supply valve 3, a flow path opening 4, output terminals 5, a switch 6, a driving state detection mechanism 8.

In the fuel cell system according to this embodiment, a fuel is stored in the fuel tank 2 to be supplied to the fuel cell 1 through a fuel flow path.

For example, hydrogen can be used as the fuel. In a case where the fuel tank 2 is charged with a hydrogen storage alloy or the like, hydrogen can be stored at lower pressure and in more effective manner than in other hydrogen supplying method.

Further, in the fuel flow path, the fuel supply valve 3 for controlling supply of the fuel from the fuel tank 2 to the fuel cell 1, and the flow path opening 4 for opening the fuel flow path to the atmosphere are provided.

On the other hand, as an oxidizer, the atmospheric air can be taken in through an air hole by natural diffusion. Generated electric power is supplied to an external apparatus through the output terminals 5.

Next, the power generation stopping method of this embodiment will be described.

Figure 2:
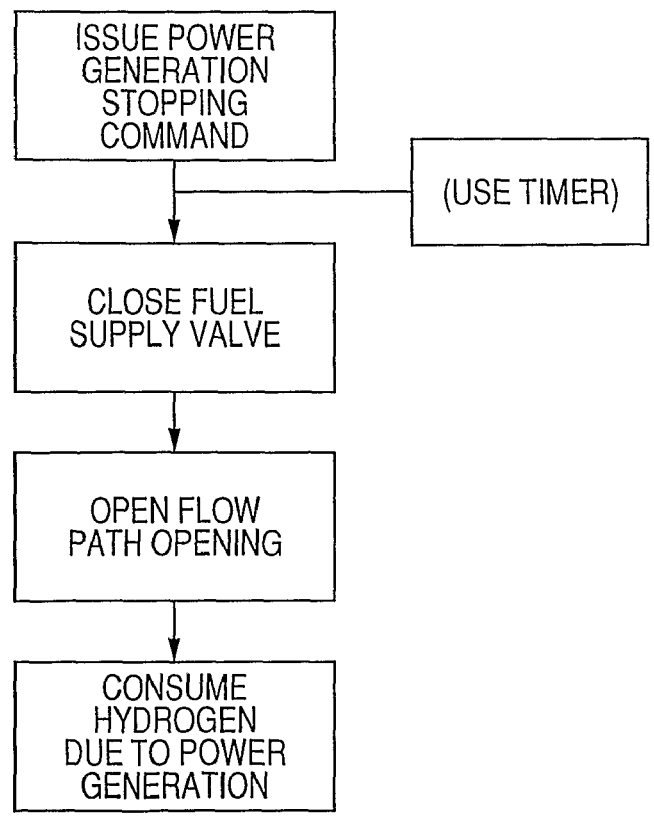
FIG. 2 is a flow chart for explaining a first method for stopping power generation of the fuel cell system according to Embodiment 1 of the present invention.

FIG. 2 is a flow chart for explaining a first power generation stopping method according to this embodiment.

First, during power generation of the fuel cell, the fuel supply valve 3 is in an open state, so a fuel is supplied to a fuel electrode which is an anode, and the atmospheric air is supplied through the air hole facing an oxidizer electrode which is a cathode.

When the driving state detection mechanism 8 receives, from an apparatus to which the fuel cell system is mounted, a power generation stopping command for the fuel cell, first, the fuel supply valve is closed to stop supply of the fuel.

Next, the flow path opening 4 is opened to lower a concentration of the fuel in the fuel flow path.

Figure 12:
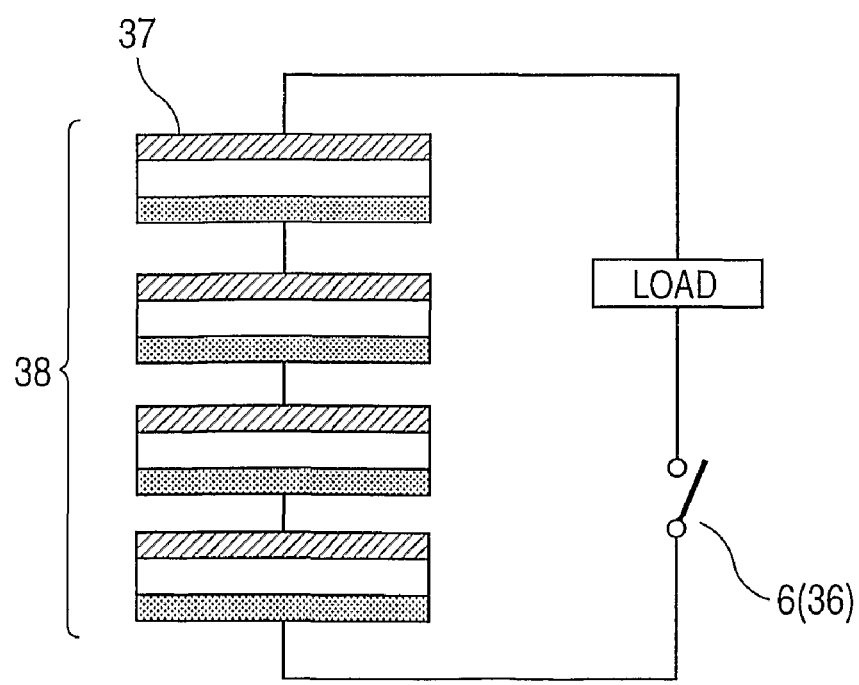
FIG. 12 is a schematic diagram for explaining a first residual fuel consuming method according to the embodiments of the present invention.

Further, as illustrated in FIG. 12, the switch 6 is closed, thereby short-circuiting the fuel cell or performing power generation by a load, and consuming a residual fuel in the flow path.

Consumption of a residual fuel is continued until at least a predetermined time elapses or a voltage between the output terminals of the fuel cell becomes equal to or lower than a certain voltage (for example, 10 mV). However, the short-circuiting or the load connection may be continued until the next power generation starts.

Further, a timing at which the flow path opening 4 is opened to reduce the concentration of the fuel in the fuel flow path may be when an electromotive force of the fuel cell is equal to or lower than a predetermined value.

Further, the timing at which the flow path opening 4 is opened to reduce the concentration of the fuel in the fuel flow path may be when a pressure in the fuel flow path is equal to or lower than a predetermined value.

By setting the flow path opening 4 to be opened when the pressure in the fuel flow path becomes a negative pressure, the residual fuel in the flow path is not discharged to an outside of the fuel cell system. Therefore, change in pressure inside the anode involved in the releasing to the atmosphere is small, so a load with respect to components is small, thus the setting is desirable. Further, by setting the flow path opening 4 to be opened when the pressure in the fuel flow path becomes a predetermined value which is lower than the atmospheric pressure, the residual fuel amount in the anode becomes smaller. Therefore, deterioration of the components due to catalytic combustion is further suppressed. Thus, the setting is desirable.

Further, the timing at which the flow path opening 4 is opened to reduce the concentration of the fuel in the fuel flow path may be when a predetermined time elapses after the electrodes of the fuel cell are short-circuited, or are connected to a load.

Figure 14:
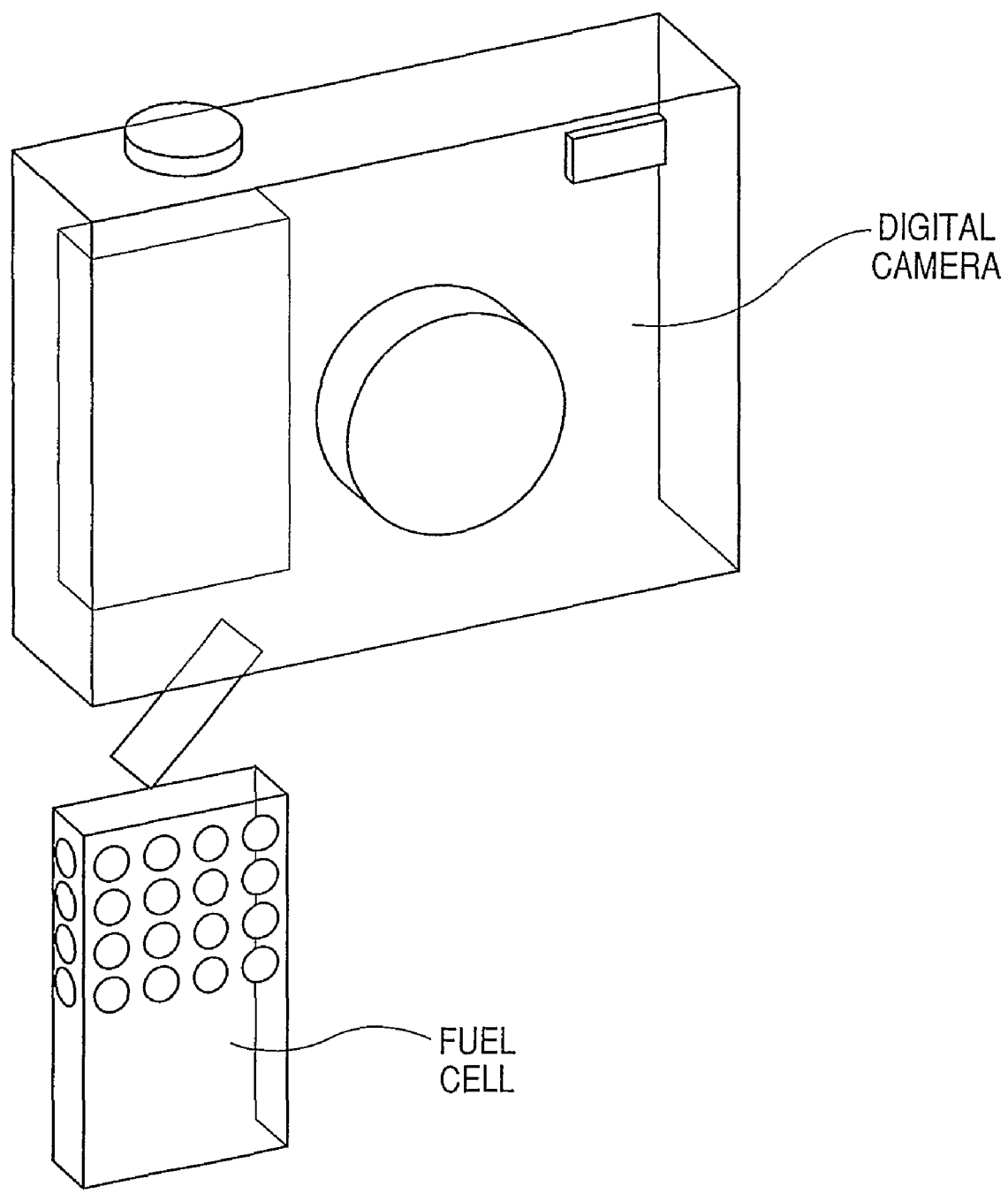
FIG. 14 is a perspective schematic diagram illustrating a structure in which the fuel cell of the present invention is mounted onto a digital camera.

Further, when the fuel cell according to this embodiment is used by being mounted onto an electronic apparatus such as a digital camera as illustrated in FIG. 14, there is a case where a power generation request and a power generation stopping request are repeatedly issued in a short period of time.

Thus, when the power generation stopping method according to the present invention is adopted only in a case where there is no power generation request within a predetermined period of time after a power generation stopping command is issued, wasting of the fuel can be prevented, and a load responsiveness can be improved.

Further, for consuming the residual fuel in the fuel flow path, the short-circuiting or connection to the load of the fuel cell may not only be performed between the output terminals of the fuel cell as illustrated in FIG. 12, but also be performed with the following structure.

That is, in a case where the fuel cell includes a fuel cell stack 38 having a plurality of fuel cell units 37, when the number of stacked fuel cell units 37 is large, the concentration of the fuel in the fuel flow path is high, or an applied load is small, polarity inversion of a part of the fuel cell units perhaps occurs. Note that, there is provided a switch 6(36).

Figure 13:
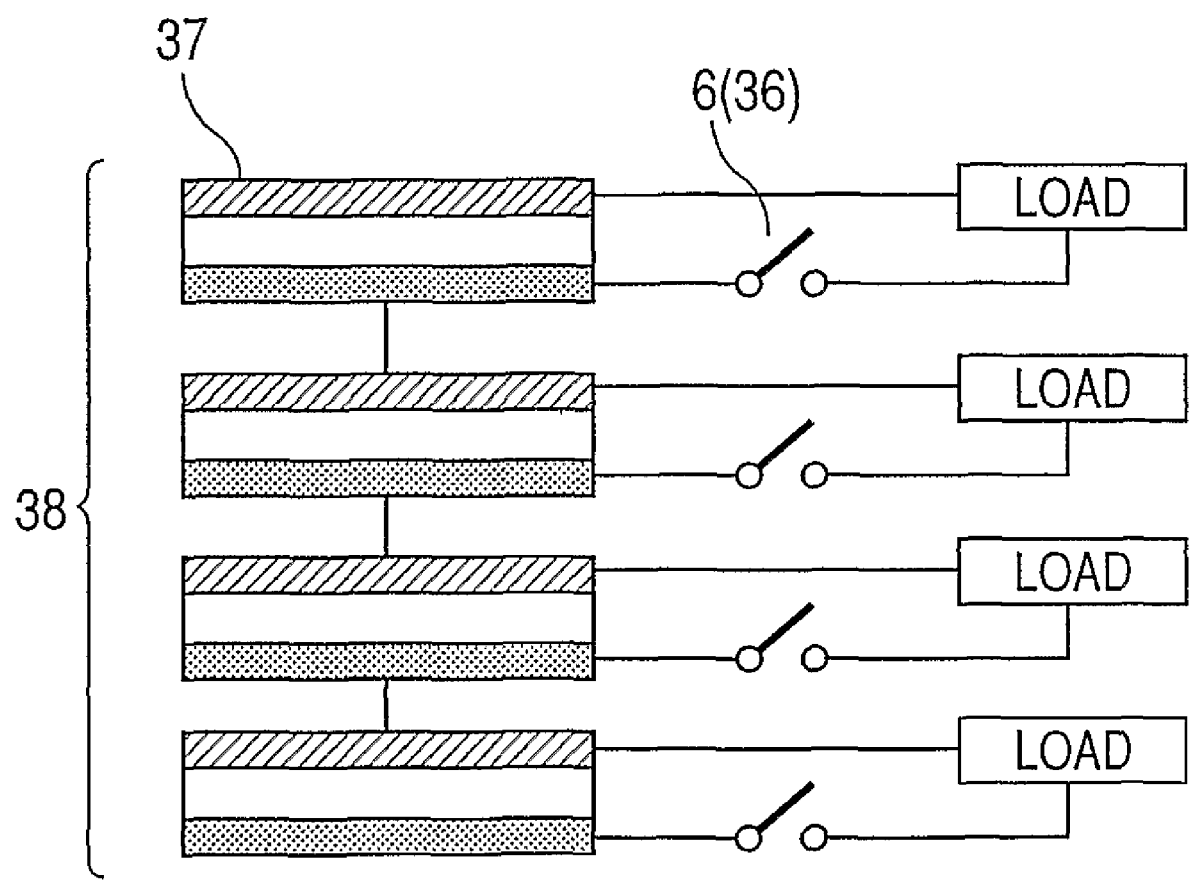
FIG. 13 is a schematic diagram for explaining a second residual fuel consuming method according to the embodiments of the present invention.

In this case, it is effective that the power generation of the fuel cell by the short-circuiting or the load be performed for each individual fuel cell unit as illustrated in FIG. 13. Note that, the same reference numerals as those of FIG. 12 denote the same members.

Further, in this embodiment, a power generation stopping method of a mode different from that of the first power generation stopping method may be adopted.

Figure 3:
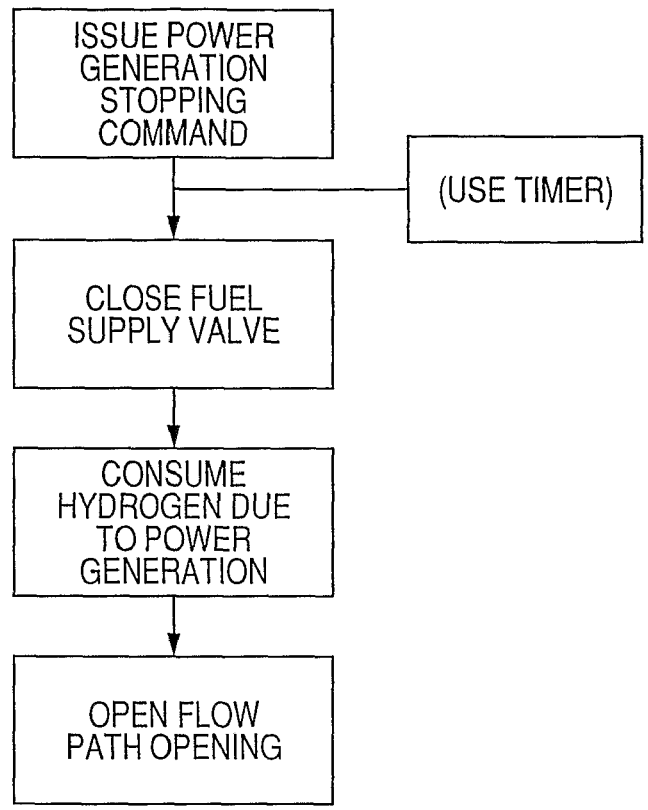
FIG. 3 is a flow chart for explaining a second method for stopping power generation of the fuel cell system according to Embodiment 1 of the present invention.

FIG. 3 is a flow chart for explaining a second power generation stopping method according to this embodiment.

According to the power generation stopping method, after the power generation of the fuel cell by the short-circuiting or the load is performed, the flow path opening 4 is opened to allow the fuel flow path to be exposed to the atmosphere, thereby eliminating a pressure difference between the anode and the cathode.

Accordingly, the power generation of the fuel cell by the short-circuiting or the load is performed to consume the residual fuel in the flow path, and then the flow path opening 4 is opened, so an unreacted fuel is prevented from being released to the outside.

Further, according to this method, deterioration of the fuel cell due to catalytic combustion caused in the vicinity of the anode catalyst by oxygen entering from the outside and the fuel can be prevented, which is more desirable.

Embodiment 2

In Embodiment 2, descriptions will be made of a fuel cell system and a method for stopping power generation of the fuel cell system according to a mode different from that of Embodiment 1.

Figure 4:
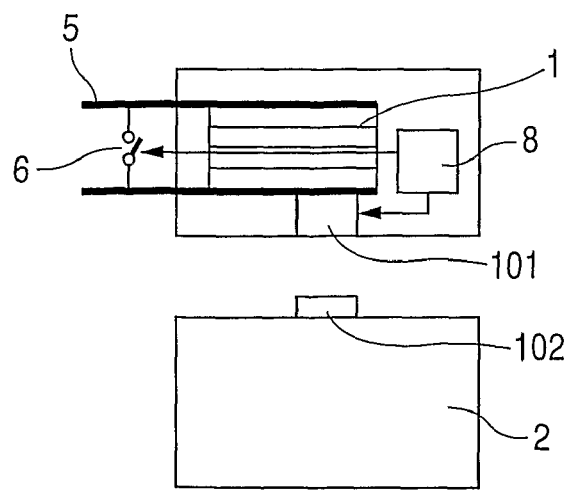
FIG. 4 is a diagram illustrating a schematic structure of a first fuel cell system according to Embodiment 2 of the present invention.

FIG. 4 is a schematic diagram illustrating a first fuel cell system according to this embodiment.

In FIG. 4, there are provided a fuel cell-side fuel supply port 101 (normally open) and a fuel tank-side fuel supply port 102. Note that, the same reference numerals denote the same components as those of FIG. 1, and redundant descriptions of the components will be omitted.

A fuel cell system according to this embodiment has the structure as that of Embodiment 1, in which the fuel tank 2 is stored with a fuel to be supplied to the fuel cell 1 through the fuel flow path.

The fuel tank and the fuel cell are connected by a connector, and a coupling of the fuel tank-side fuel supply port 102 is in an open state when the connector is connected and is in a close state (normally close) when the connector is disconnected.

On the other hand, a coupling of the fuel cell-side fuel supply port 101 is always open (normally open).

Next, a description will be made of the power generation stopping method according to this embodiment.

Figure 5:
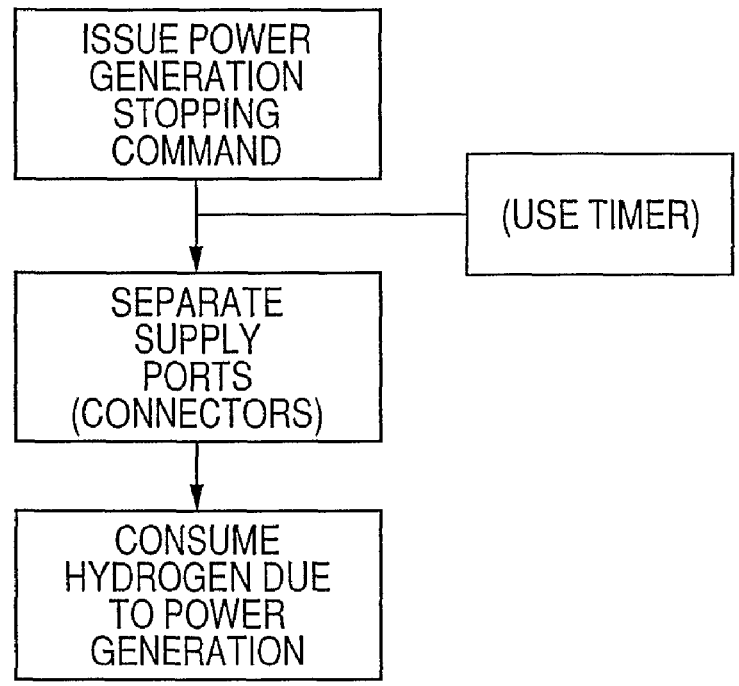
FIG. 5 is a flow chart for explaining a first method for stopping power generation of the fuel cell system according to Embodiment 2 of the present invention.

FIG. 5 is a flow chart for explaining a first power generation stopping method according to this embodiment.

In FIG. 5, first, when the fuel tank 2 is connected to the fuel cell 1, the coupling of the fuel tank-side fuel supply port 102 is opened, so the fuel is supplied to the fuel cell 1.

During power generation, the fuel is supplied to the anode, and the atmospheric air is supplied to the cathode from the air hole facing the cathode.

Upon reception of a power generation stopping command for the fuel cell from the apparatus to which the fuel cell system is mounted, first, the fuel tank 2 is separated from the fuel cell 1, thereby stopping the supply of the fuel.

In the fuel flow path, the atmospheric air flows in from the fuel cell-side fuel supply port 101.

Further, as illustrated in FIG. 12, by closing the switch 6 provided between the output terminals of the fuel cell, the power generation of the fuel cell by the short-circuiting or the load is performed, thereby consuming the residual fuel in the flow path.

Consumption of the residual fuel is continued until at least a predetermined time elapses or a voltage between the output terminals of the fuel cell becomes equal to or lower than a certain voltage (for example, 10 mV). However, the short-circuiting or the load connection may be continued until the next power generation starts.

Further, the timing at which the flow path opening 4 is opened to reduce the concentration of the fuel in the fuel flow path may be when an electromotive force of the fuel cell is equal to or lower than a predetermined value.

Further, the timing at which the flow path opening 4 is opened to reduce the concentration of the fuel in the fuel flow path may be when a pressure in the anode is equal to or lower than a predetermined value.

Further, the timing at which the flow path opening 4 is opened to reduce the concentration of the fuel in the fuel flow path may be when a predetermined time elapses after the electrodes of the fuel cell are short-circuited, or are connected to a load.

Further, when the fuel cell according to this embodiment is used by being mounted onto an electronic apparatus such as a digital camera as illustrated in FIG. 14, there is a case where a power generation request and a power generation stopping request are repeatedly issued in a short period of time.

Thus, when the power generation stopping method according to the present invention is adopted only in a case where there is no power generation request within a predetermined period of time after a power generation stopping command is issued, wasting of the fuel can be prevented, and a load responsiveness can be improved, thus being desirable.

Further, for consuming the residual fuel in the fuel flow path, the short-circuiting or connection to the load of the fuel cell may not only be performed between the output terminals of the fuel cell as illustrated in FIG. 12, but also be performed with the following structure.

That is, in the case where the fuel cell includes the fuel cell stack 38 having the plurality of fuel cell units 37, when the number of stacked fuel cell units 37 is large, the concentration of the fuel in the fuel flow path is high, or an applied load is small, polarity inversion of a part of the fuel cell units perhaps occurs.

Therefore, in this case, as shown in FIG. 13, it is desirable that the power generation of the fuel cell by the short-circuiting or the load be performed for each individual fuel cell unit.

In this embodiment, a structure according to a mode different from that of the first fuel cell system may be adopted.

Figure 6:
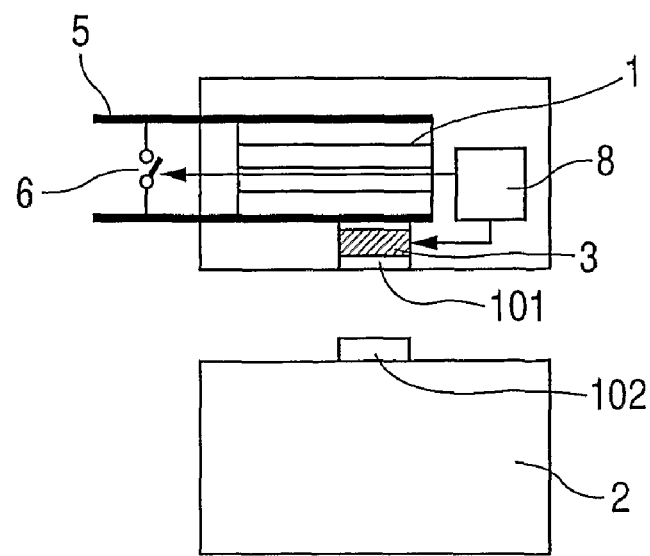
FIG. 6 is a schematic diagram illustrating a second fuel cell system according to Embodiment 2 of the present invention.

FIG. 6 is a diagram for explaining a schematic structure of a second fuel cell system according to this embodiment. The same reference numerals as those of FIG. 4 denote the same members as those of FIG. 4.

In this mode, as illustrated in FIG. 6, the fuel flow path between the fuel cell unit of the fuel cell and one of the couplings is provided with the fuel supply valve 3.

Figure 7:
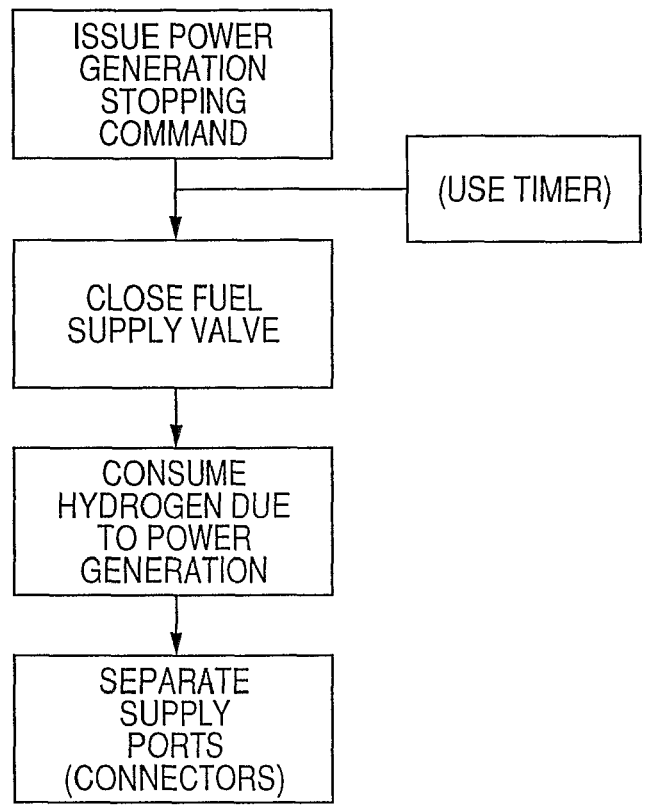
FIG. 7 is a flow chart for explaining a second method for stopping power generation of the fuel cell system according to Embodiment 2 of the present invention.

In this case, upon reception of the power generation stopping command, the first power generation stopping method illustrated in FIG. 5 may be performed, or alternatively, a second power generation stopping method different therefrom may be performed. FIG. 7 is a flow chart for explaining the second power generation stopping method according to this embodiment.

In FIG. 7, upon reception of the power generation stopping command for the fuel cell from the apparatus to which the fuel cell system is mounted, first, the fuel supply valve 3 is closed to stop supply of the fuel.

Next, by closing the switch 6, the power generation is performed by short-circuiting of the fuel cell or by the load, thus consuming a residual fuel in the flow path.

Consumption of a residual fuel is continued until at least a predetermined time elapses or a voltage between the output terminals of the fuel cell becomes equal to or lower than a certain voltage (for example, 10 mV). However, the short-circuiting or the load connection may be continued until the next power generation starts.

At last, the fuel tank 2 is separated from the fuel cell 1, and the fuel supply valve 3 is opened to expose an inside of the fuel flow path to the atmosphere.

According to the second power generation stopping method, the fuel is prevented from being released to the outside, and deterioration of the fuel cell due to catalytic combustion caused in the vicinity of the anode catalyst by oxygen entering from the outside and the fuel can be prevented, which is more desirable.

According to the fuel cell system and the method for stopping power generation of the fuel cell system of Embodiments 1 and 2 described above, without using an inert gas, the pressure difference between the anode and the cathode during the stop state of the operation can be reduced, and the deterioration of the fuel cell can be suppressed to realize downsizing.

Embodiment 3

In Embodiment 3, description will be made of a fuel cell system and a method for stopping power generation of the fuel cell system with a structural example capable of rapidly eliminating a pressure difference between an anode and a cathode during a stop state of an operation.

Figure 8:
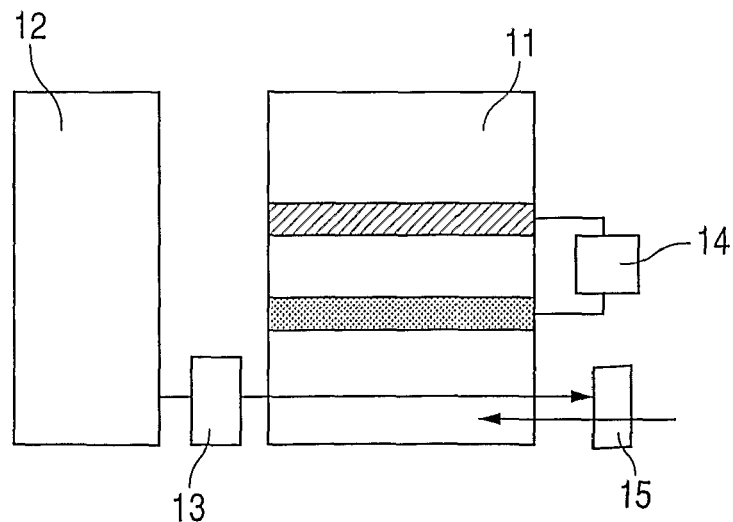
FIG. 8 is a diagram illustrating a schematic structure of a fuel cell system according to Embodiment 3 of the present invention.

FIG. 8 illustrates a schematic diagram of the fuel cell system according to this embodiment.

In FIG. 8, there are provided a fuel cell 11, a fuel tank 12, a fuel supply control unit 13, a fuel consuming unit 14, and a negative pressure operation valve 15.

The fuel cell according to this embodiment includes the fuel cell 11 having a fuel electrode and an oxidizer electrode, the fuel tank 12 for supplying a fuel to the fuel cell through the fuel flow path, and the fuel supply control unit 13, which is provided between the fuel cell and the fuel tank, for controlling the supply of the fuel.

Further, there is provided the fuel consuming unit 14 for providing a resistor through which the fuel electrode and the oxidizer electrode are connected to each other.

Further, there is provided the negative pressure operation valve 15, which is provided so as to separate the fuel flow path from the atmosphere. When a state where a pressure in the fuel flow path is equal to or higher than the atmospheric pressure, the negative pressure operation valve 15 is in a close state, and when the pressure is lower than the atmospheric pressure, the negative pressure operation valve 15 is in an open state.

The fuel cell 11 includes a proton conductive polymer electrolyte and two electrodes, that is, a fuel electrode serving as the anode and an oxidizer electrode serving as the cathode each including a catalyst layer and a gas diffusion layer, the proton conductive polymer electrolyte being sandwiched between the catalyst layer and the gas diffusion layer.

A hydrogen fuel is supplied from the fuel tank to the fuel electrode and oxygen is supplied to the oxidizer electrode by natural diffusion.

Any member can be used for the polymer electrolyte membrane, but a perfluorosulfonic acid proton exchange resin membrane is desirable.

In each of the electrodes, a catalyst ink is prepared by mixing catalyst-carrying particles such as platinum black or platinum-carrying carbon and an organic solvent such as a polymer electrolyte solution or isopropyl alcohol.

Each of the catalyst layers is prepared by performing film formation using the resultant ink on a polymer film made of polytetrafluoroethylene (PTFE) etc., a conductive porous carbon electrode substrate, or the like by a spray coating method, a screen printing method, a doctor blade method, or the like.

The obtained catalyst layers are fixed to both sides of the polymer electrolyte membrane, respectively, by applying pressure through heat transfer or the like in a state where a side of the each catalyst layer on which the catalyst is carried to be directed inwardly on each side of the polymer electrolyte membrane, thereby enabling to obtain a membrane electrode assembly for the polymer electrolyte fuel cell.

As the fuel tank 12, any member can be used as long as being capable of supplying the hydrogen fuel to the fuel cell.

For example, when a hydrogen storage alloy is charged in the fuel tank 12, hydrogen can be stored at lower pressure and with higher efficiency.

Further, there may be employed a structure in which a liquid fuel such as methanol or ethanol and a reformer thereof are provided, and hydrogen is sent to the fuel cell.

The fuel flow path has a structure in which a connection portion between components is subjected to a sealing treatment so as not to allow the hydrogen fuel supplied from the fuel tank to leak out of the system, thereby being maintained in a hermetically sealed state.

The fuel supply control unit 13 enables supply of the fuel from the fuel tank to the fuel cell at a time of driving, and cuts off supply of the fuel by receiving a stopping signal from a side of the apparatus at a time of stopping.

Further, the fuel tank and the fuel cell are connected by a connector. A coupling placed at a connection port is in an open state when the connector is connected, and is in a close state when the connector is disconnected. There may be employed a method of cutting off the fuel supply by disconnecting the fuel tank at a time of stopping.

At the time of stopping, the fuel consuming unit 14 allows the resistor to connect the fuel electrode and the oxidizer electrode of the fuel cell to each other, thereby consuming the fuel remaining in the fuel flow path.

The connection of the resistor is continued until at least a predetermined time elapses or a potential difference of the fuel cell becomes equal to or lower than a certain voltage (for example, 10 mV). However, the connection may be continued until the next power generation starts. Further, in the fuel cell stack, there is caused variation in voltage among stacked cell units, thereby perhaps occurring polarity inversion of a part of the fuel cell units. Therefore, it is desirable that the connection between the output terminals be performed for each fuel cell unit.

The negative pressure operation valve 15 is a valve which opens/closes according to a relationship between a pressure in the fuel flow path and the atmospheric pressure. When the pressure in the fuel flow path is equal to or higher than the atmospheric pressure, the negative pressure operation valve 15 is in the close state, thereby making the fuel flow path be dead ended. When the pressure in the fuel flow path is lower than the atmospheric pressure, the negative pressure operation valve 15 is in the open state, thereby opening the fuel flow path to the atmosphere. A position of the negative pressure operation valve 15 is not particularly limited, and may be any position in the fuel flow path.

Further, regarding a gas flow, it is desirable that the fuel does not flow out to the atmosphere side and only the atmospheric air flow into the fuel flow path.

Examples of a valve for controlling a one-way flow direction of a fluid as described above include a check valve and a relief valve. However, those are not obligatory.

Next, a description will be made of the power generation stopping method according to this embodiment.

Figure 9:
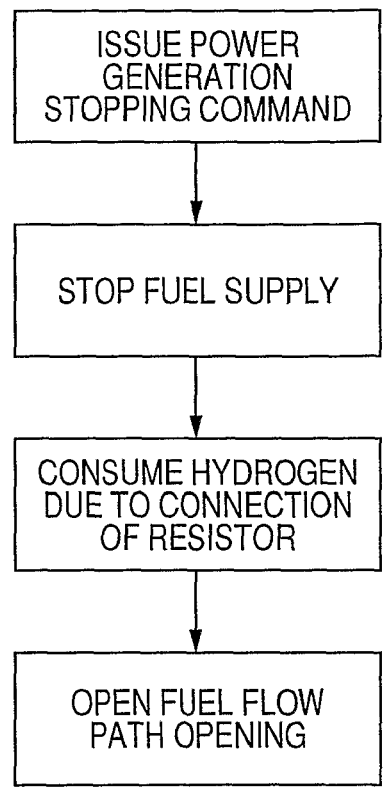
FIG. 9 is a flow chart for explaining a method for stopping power generation of the fuel cell system according to Embodiment 3 of the present invention.

FIG. 9 illustrates a flow chart for explaining the power generation stopping method according to this embodiment.

In FIG. 9, when a power generation stopping command for the fuel cell is received from the apparatus to which the fuel cell system is mounted, first, the fuel supply control unit shuts off the flow path between the fuel tank and the fuel cell, thereby stopping the supply of the fuel.

Next, by using the fuel consuming unit, the resistor is provided so as to connect the fuel electrode and the oxidizer electrode of the fuel cell to each other, thereby consuming a hydrogen fuel remaining in the fuel flow path.

The hydrogen in the sealed flow path is consumed, thereby allowing the pressure in the fuel flow path to decrease. When the pressure becomes lower than the atmospheric pressure, the negative pressure operation valve automatically opens due to the pressure difference.

As a result, air flows into the fuel flow path, thereby performing air replacement.

Accordingly, when the fuel cell is stopped, with respect to the air replacement in the fuel flow path, a passive control can be performed with a scavenge unit and an exhaust unit being omitted, so downsizing can be realized.

Further, the resistor is provided so as to connect the fuel electrode and the oxidizer electrode of the fuel cell to each other, thereby consuming the hydrogen fuel remaining in the fuel flow path. After that, the air replacement is performed, so an unreacted fuel can be prevented from being released to the outside of the system.

Further, in a state where there is a negative pressure in the fuel flow path, air flows in, so the rapid air replacement is performed, and the pressure difference between the fuel electrode and the oxidizer electrode is eliminated quickly.

As a result, the residual fuel is consumed, and air is supplied to both the electrodes, the fuel cell can be stopped in a state where there is almost no potential difference.

Accordingly, deterioration of the fuel cell at the time of stopping can be suppressed.

Embodiment 4

In Embodiment 4, a description will be made of a structural example in which a fuel tank charged with a hydrogen storage alloy, and a check valve is used as a negative pressure operation valve.

Figure 10:
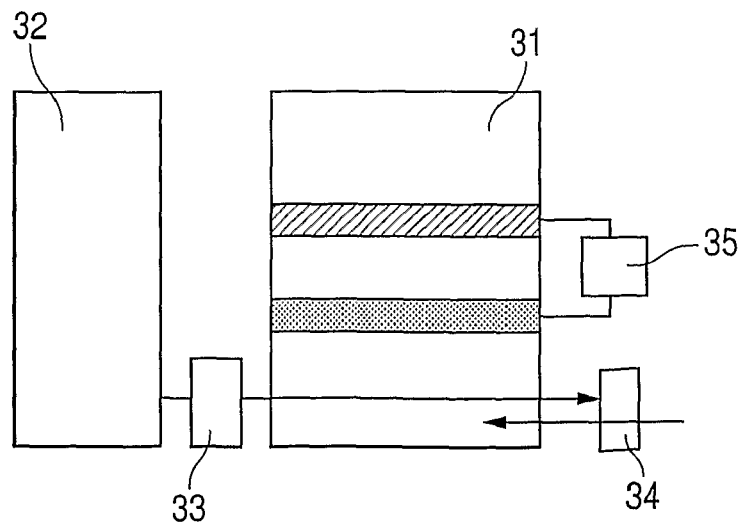
FIG. 10 is a diagram illustrating a schematic structure of a fuel cell system according to Embodiment 4 of the present invention.

FIG. 10 illustrates a schematic diagram of a fuel cell system according to this embodiment.

There are provided a fuel cell 31, a fuel tank 32, a fuel supply valve 33, a check valve 34, a fuel consuming unit 35.

In this embodiment, the fuel tank 32 is charged with a hydrogen storage alloy, and a hydrogen fuel is stored therein to be supplied to the fuel cell 31 through a fuel flow path.

Further, in the fuel flow path, there are provided the fuel supply valve 33 for controlling supply of the fuel coming from the fuel tank to the fuel cell, and a check valve 34 provided in a partition wall between the fuel flow path and the atmosphere.

The check valve shuts off a flow of a fluid from the fuel flow path side to the atmosphere side, and allows only a flow of the fluid from the atmosphere side to the fuel flow path side.

On the other hand, as an oxidizer, air can be taken in through an air hole by natural diffusion. Generated power is supplied to an external apparatus through output terminals.

During the power generation of the fuel cell, the fuel supply valve is opened, and the fuel is supplied to the fuel electrode, and air is supplied to the oxidizer electrode from the air hole facing the oxidizer electrode. When a power generation stopping command for the fuel cell is received from the apparatus to which the fuel cell system is mounted, first, the fuel supply valve is closed to stop supply of the fuel, and an inside of the fuel flow path is hermetically sealed.

Next, as illustrated in FIG. 12, the switch 36 as a component of the fuel consuming unit 35 is closed to short-circuit the fuel cell or perform power generation by a load, thereby allowing a residual fuel in the flow path to be consumed.

A pressure in the fuel flow path decreases when the fuel is consumed. As a result, the pressure becomes negative with respect to the atmospheric pressure.

After that, due to a pressure difference between the fuel flow path and the atmosphere, air flows in through the check valve, thereby allowing air to flow into the fuel flow path, and an inside of the fuel flow path is replaced with air. As a result, a pressure difference between the fuel electrode and the oxidizer electrode is maintained to be at approximately zero.

Consumption of a residual fuel is continued until at least a predetermined time elapses or a voltage between the output terminals of the fuel cell becomes equal to or lower than a certain voltage (for example, 10 mV). However, short-circuiting or load connection may be continued until the next power generation starts.

Further, when the fuel cell according to this embodiment is used by being mounted onto an electronic apparatus such as a digital camera as illustrated in FIG. 14, there is a case where a power generation request and a power generation stopping request are repeatedly issued in a short period of time. Thus, when the power generation stopping method according to the present invention is adopted only in a case where there is no power generation request within a predetermined period of time after a power generation stopping command is issued, wasting of the fuel can be prevented, and a load responsiveness can be improved.

Further, in a case where the fuel cell includes a fuel cell stack 38 having a plurality of fuel cell units 37, when the short-circuiting or power generation by the load is performed between the output terminals of the fuel cell stack, there is caused variation in voltage distribution between cell units, so polarity inversion of a part of the fuel cell units perhaps occurs. Therefore, in this case, it is desirable that the short-circuiting or the power generation by the load of the fuel cell be performed for each fuel cell unit as illustrated in FIG. 13.

Embodiment 5

In Embodiment 5, a description will be made of a structural example in which a fuel tank charged with a hydrogen storage alloy is used and a relief valve is used as a negative pressure operation valve.

Figure 11:
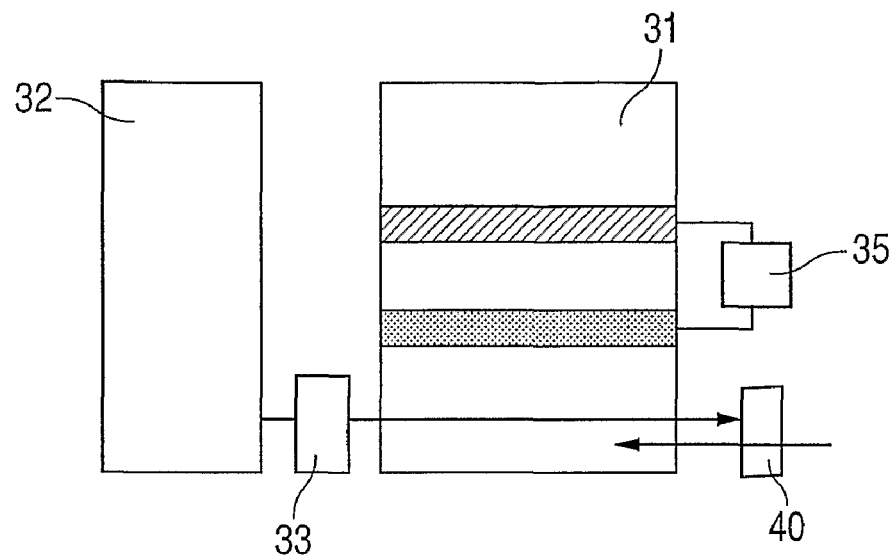
FIG. 11 is a diagram illustrating a schematic structure of a fuel cell system according to Embodiment 5 of the present invention.

FIG. 11 illustrates a structure thereof according to this embodiment.

Note that, this embodiment is basically the same as above Embodiment 4 illustrated in FIG. 10, except for the relief valve. The same components are denoted by the same reference numerals.

As in Embodiment 4 of FIG. 10, the fuel tank 32 is charged with the hydrogen storage alloy, and a hydrogen fuel is stored therein. The fuel is supplied to the fuel cell 31 through the fuel flow path by a control of the fuel supply valve 33.

A relief valve 40 is provided in the partition wall between the fuel flow path and the atmosphere in place of the check valve. The relief valve opens/closes according to a relationship between the pressure in the fuel flow path and the atmospheric pressure. When the pressure in the fuel flow path is equal to or higher than the atmospheric pressure, the relief valve is in a close state, when the pressure in the fuel flow path is lower than the atmospheric pressure, the relief valve is in an open state.

Further, the relief valve shuts off a flow of a fluid from the fuel flow path side to the atmosphere side, and only allows the flow of the fluid flowing from the atmosphere side to the fuel flow path side. On the other hand, as the oxidizer, air can be taken in through an air hole by natural diffusion. Generated power is supplied to an external apparatus through the output terminals.

During power generation, the fuel supply valve is in the open state, so the fuel is supplied to the fuel electrode, and air is supplied to the cathode from the air hole facing the cathode.

When a power generation stopping command for the fuel cell is received from the apparatus to which the fuel cell system is mounted, first, the fuel supply valve is closed, the supply of the fuel is stopped, and an inside of the fuel flow path is hermetically sealed.

Next, as illustrated in FIG. 12 or 13, the switch 36 as a component of the fuel consuming unit 35 is closed to short-circuit the fuel cell or perform power generation by a load, thereby allowing a residual fuel in the flow path to be consumed.

A pressure in the fuel flow path decreases as the fuel is consumed. As a result, the pressure becomes negative with respect to the atmospheric pressure.

After that, due to a pressure difference between the fuel flow path and the atmosphere, the relief valve opens. Air flows through the resultant opening portion into the fuel flow path. As a result, the inside of the fuel flow path is replaced with air.

Accordingly, a potential difference between the fuel electrode and the oxidizer electrode is maintained to be at approximately zero.

Further, by setting a set operating pressure for opening the relief valve to a predetermined value lower than the atmospheric pressure, the valve can be opened after the fuel in the fuel flow path is consumed with reliability.

Further, the set pressure for the opening operation of the relief valve is not necessarily lower than the atmospheric pressure. In a case where there is caused a time lag in the opening operation of the relief valve, with consideration to a possibility of a shift to an excessive negative pressure due to fuel consumption during the time lag, the set pressure may be set slightly higher than the atmospheric pressure.

Consumption of a residual fuel is continued until at least a predetermined time elapses or a voltage between the output terminals of the fuel cell becomes equal to or lower than a certain voltage (for example, 10 mV). However, the short-circuiting or the load connection may be continued until the next power generation starts.

Further, when the fuel cell according to this embodiment is used by being mounted onto an electronic apparatus such as a digital camera as illustrated in FIG. 14, there is a case where a power generation request and a power generation stopping request are repeatedly issued in a short period of time.

Thus, when the power generation stopping method according to the present invention is adopted only in a case where there is no power generation request within a predetermined period of time after a power generation stopping command is issued, wasting of the fuel can be prevented, and a load responsiveness can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A method for stopping power generation of fuel cell system comprising: a fuel cell including a fuel electrode and an oxidizer electrode; a fuel container; and a fuel flow path for supplying a fuel from the fuel container to the fuel cell, which enables suppression of a pressure difference between the fuel electrode and the oxidizer electrode during a stop state of an operation of the fuel cell, the method comprising the steps of, during the stop state of the operation of the fuel cell:
stopping supply of the fuel from the fuel container to the fuel cell;
consuming a residual fuel in the fuel flow path by short-circuiting between the fuel electrode and the oxidizer electrode or connecting a load between the fuel electrode and the oxidizer electrode; and
opening the fuel flow path to the atmosphere.

2. The method according to claim 1, wherein the step of stopping supply of the fuel is performed first among the step of stopping supply of the fuel, the step of consuming the residual fuel, and the step of opening the fuel flow path to the atmosphere.

3. The method according to claim 2, wherein the step of consuming the residual fuel is performed first among the step of consuming the residual fuel and the step of opening the fuel flow path to the atmosphere.

4. The method according to claim 3, wherein opening the fuel flow path to the atmosphere starts when a pressure in the fuel flow path becomes negative with respect to the atmospheric pressure due to the consumption of the residual fuel in the step of consuming the residual fuel.

5. The method according to claim 3, wherein opening the fuel flow path to the atmosphere starts when an electromotive force of the fuel cell becomes equal to or smaller than a predetermined value.

6. The method according to claim 3, wherein opening the fuel flow path to the atmosphere starts when a pressure in the fuel flow path becomes equal to or lower than a predetermined value.

7. The method according to claim 3, wherein opening the fuel flow path to the atmosphere starts when the step of consuming the residual fuel is performed first among the step of consuming the residual fuel and the step of opening the fuel flow path to the atmosphere and a predetermined time period elapses.

8. The method according to claim 1, wherein stopping the supply of the fuel is performed by closing a fuel supply valve provided in the fuel flow path or releasing connection between the fuel container and the fuel cell.

9. The method according to claim 1, wherein opening the fuel flow path to the atmosphere is performed by opening a flow path opening provided to the fuel flow path, releasing connection between the fuel container and the fuel cell, or operating a negative pressure operation valve provided to the fuel flow path through an intermediation of the atmosphere.

10. The method according to claim 1, wherein short-circuiting between the fuel electrode and the oxidizer electrode or connecting the load between the fuel electrode and the oxidizer electrode is continued at least until an electromotive force of the fuel cell becomes equal to or smaller than a predetermined value.

11. The method according to claim 1, wherein short-circuiting between the fuel electrode and the oxidizer electrode or connecting the load between the fuel electrode and the oxidizer electrode is continued at least until a predetermined time period elapses.

12. The method according to claim 1, wherein:
the fuel cell comprises a fuel cell stack having a plurality of fuel cell units stacked on each other; and
short-circuiting between the fuel electrode and the oxidizer electrode or connecting the load between the fuel electrode and the oxidizer electrode is performed between the fuel electrode and the oxidizer electrode of each of the fuel cell units or between output terminals of the fuel cell stack.

13. The method according to claim 1, wherein the oxidizer electrode comprises a flow path opened to the atmosphere.

14. The method according to claim 1, wherein:
the fuel cell comprises, at one end thereof, a fuel inlet for supplying the fuel and, at another end thereof, a flow path opening for opening the fuel flow path to the atmosphere in the step of opening the fuel flow path to the atmosphere;
the flow path opening is closed at least during normal power generation.

15. A fuel cell system comprising:
a fuel cell including a fuel electrode and an oxidizer electrode;
a fuel container;
a fuel flow path for supplying a fuel from the fuel container to the fuel cell;
a fuel supply control unit, which is provided in the fuel flow path between the fuel cell and the fuel container, for controlling supply of the fuel;
a fuel consuming unit for providing a resistor to connect the fuel electrode and the oxidizer electrode of the fuel cell to each other; and
a unit for opening the fuel flow path to the atmosphere, which is provided in the fuel cell system.

16. The fuel cell system according to claim 15, wherein the unit for opening the fuel flow path to the atmosphere comprises a flow path opening provided to the fuel flow path.

17. The fuel cell system according to claim 15, wherein the unit for opening the fuel flow path to the atmosphere comprises a unit allowing the atmosphere to flow into the fuel flow path due to disconnection between the fuel container and the fuel cell.

18. The fuel cell system according to claim 15, wherein the unit for opening the fuel flow path to the atmosphere comprises a negative pressure operation valve, which is provided to the fuel flow path through an intermediation of the atmosphere, and which is in a close state when a pressure in the fuel flow path is equal to or higher than the atmospheric pressure, and is in an open state when the pressure in the fuel flow path is lower than the atmospheric pressure.

19. The fuel cell system according to claim 18, wherein the negative pressure operation valve is structured so that a fluid flows only in one direction from a side of the atmosphere to a side of the fuel flow path.

20. The fuel cell system according to claim 18, wherein the negative pressure operation valve is opened by a predetermined pressure lower than the atmospheric pressure.

* * * * *